(12) United States Patent
Wechsler et al.

(10) Patent No.: US 10,071,644 B2
(45) Date of Patent: Sep. 11, 2018

(54) INDUCTIVE POWER TRANSFER PAD, SYSTEM FOR INDUCTIVE POWER TRANSFER AND METHOD OF OPERATING INDUCTIVE POWER TRANSFER PAD

(71) Applicant: Bombardier Primove GmbH, Berlin (DE)

(72) Inventors: Simon Wechsler, Mannheim (DE); Dominik Anders, Mannheim (DE)

(73) Assignee: Bombardier Primove GmbH, Berlin (DE)

( * ) Notice: Subject to any disclaimer, the term of this patent is extended or adjusted under 35 U.S.C. 154(b) by 215 days.

(21) Appl. No.: 15/121,979

(22) PCT Filed: Feb. 27, 2015

(86) PCT No.: PCT/EP2015/054106
§ 371 (c)(1),
(2) Date: Aug. 26, 2016

(87) PCT Pub. No.: WO2015/128450
PCT Pub. Date: Sep. 3, 2015

(65) Prior Publication Data
US 2017/0080815 A1   Mar. 23, 2017

(30) Foreign Application Priority Data
Feb. 28, 2014   (GB) .................................. 1403547.1

(51) Int. Cl.
*H02J 7/00*   (2006.01)
*B60L 11/18*   (2006.01)
(Continued)

(52) U.S. Cl.
CPC ......... *B60L 11/1829* (2013.01); *B60L 11/182* (2013.01); *H02J 5/005* (2013.01);
(Continued)

(58) Field of Classification Search
CPC ....................................................... H02J 7/025
(Continued)

(56) References Cited

U.S. PATENT DOCUMENTS 5,281,901 A * 1/1994 Yardley ................ G05D 1/0265
180/167
5,654,621 A   8/1997 Seelig
(Continued)

FOREIGN PATENT DOCUMENTS

DE   102007033654 A1   4/2008
DE   102010042395 A1   4/2012
(Continued)

*Primary Examiner* — Yalkew Fantu
(74) *Attorney, Agent, or Firm* — The Webb Law Firm

(57) ABSTRACT

Provided herein is an inductive power transfer pad for inductive power transfer to a vehicle. The inductive power transfer pad includes a stationary part and a movable part. The movable part includes a primary winding structure. The movable part is movable between a retracted state and an extended state. The power transfer pad is designed or controllable such that the movable part is only movable to a position from a set of predetermined positions. The set of predetermined positions is a subset of the set of all positions between the retracted and the extended state. A method of operating an inductive power transfer pad and an inductive power transfer system are also provided herein.

18 Claims, 4 Drawing Sheets

(51) Int. Cl.
*H02J 50/60* (2016.01)
*H02J 5/00* (2016.01)
*H02J 7/02* (2016.01)
*H02J 50/10* (2016.01)

(52) U.S. Cl.
CPC .............. *H02J 7/025* (2013.01); *H02J 50/10* (2016.02); *H02J 50/60* (2016.02); *B60L 2230/10* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 2004/0068439 | A1* | 4/2004 | Elgrably | ................ G06Q 30/02 705/14.63 |
| 2007/0228779 | A1 | 10/2007 | Stallfort | |
| 2010/0235006 | A1 | 9/2010 | Brown | |
| 2011/0043381 | A1* | 2/2011 | Sirota | .................... G08G 1/017 340/937 |
| 2011/0133692 | A1 | 6/2011 | Shimoyama | |
| 2012/0256586 | A1 | 10/2012 | Becker et al. | |
| 2012/0262002 | A1 | 10/2012 | Widmer et al. | |
| 2012/0280649 | A1 | 11/2012 | Jung | |
| 2013/0033227 | A1 | 2/2013 | Gibbons, Jr. | |
| 2013/0249470 | A1 | 9/2013 | Martin et al. | |
| 2015/0155095 | A1* | 6/2015 | Wu | ........................ H02J 17/00 307/104 |
| 2015/0224882 | A1 | 8/2015 | Brill et al. | |
| 2016/0225260 | A1* | 8/2016 | Lin | .................. G08G 1/096791 |

FOREIGN PATENT DOCUMENTS

| | | |
|---|---|---|
| DE | 202011050264 U1 | 10/2012 |
| EP | 0788212 A2 | 8/1997 |
| EP | 1844967 A1 | 10/2007 |
| GB | 2508923 A | 6/2014 |
| GB | 2508924 A | 6/2014 |
| GB | 2512864 A | 10/2014 |
| GB | 2517679 A | 3/2015 |
| WO | 2013176752 A2 | 11/2013 |
| WO | 2014029439 A1 | 2/2014 |
| WO | 2014035399 A1 | 3/2014 |

* cited by examiner

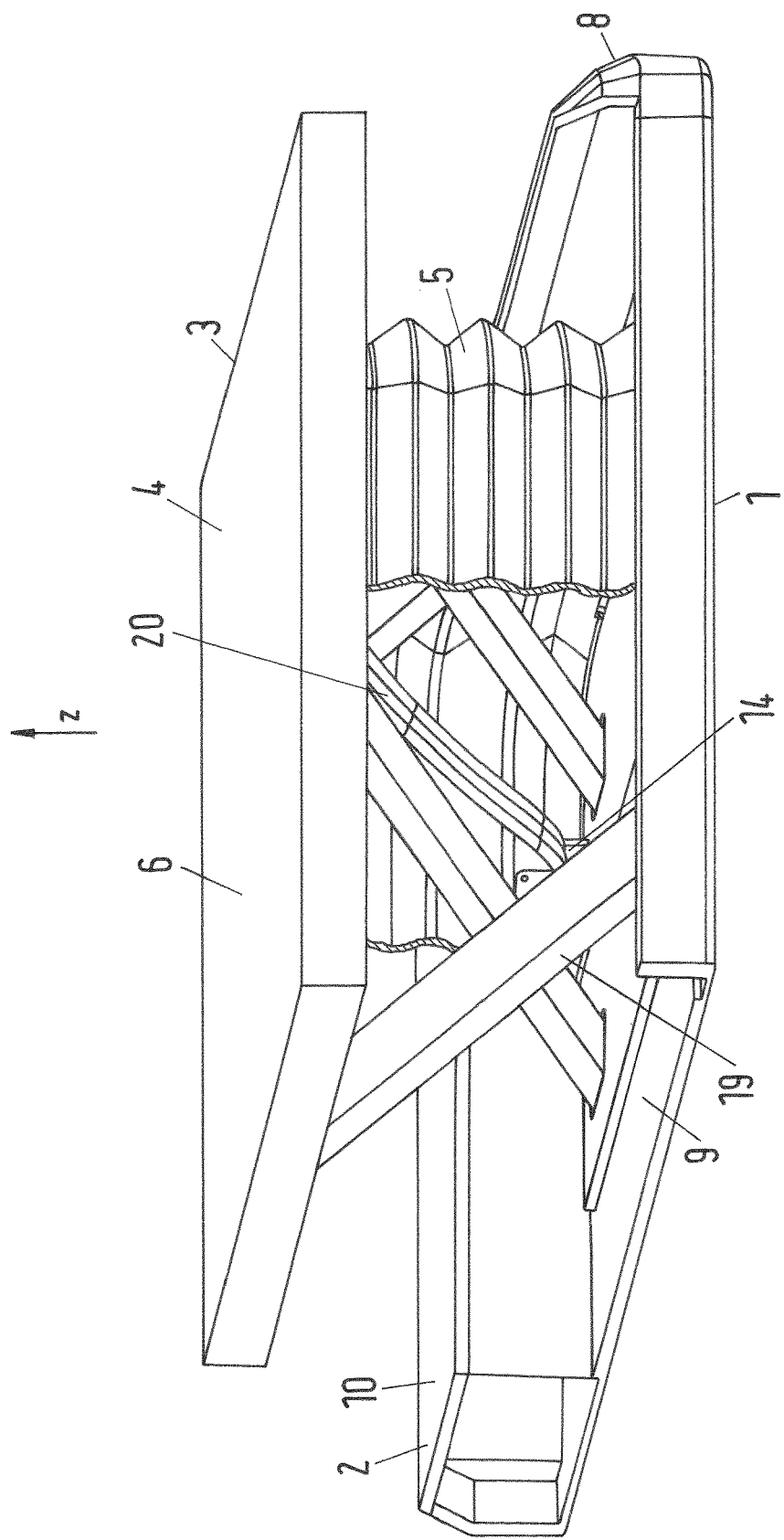

INDUCTIVE POWER TRANSFER PAD, SYSTEM FOR INDUCTIVE POWER TRANSFER AND METHOD OF OPERATING INDUCTIVE POWER TRANSFER PAD

CROSS-REFERENCE TO RELATED APPLICATIONS

This application is the United States national phase of International Application No. PCT/EP2015/054106 filed Feb. 27, 2015, and claims priority to United Kingdom Patent Application No. 1403547.1 filed Feb. 28, 2014, the disclosures of which are hereby incorporated in their entirety by reference.

BACKGROUND OF THE INVENTION

Field of the Invention

The invention relates to an inductive power transfer pad and a system for inductive power transfer, in particular to a vehicle. Furthermore, the invention relates to a method of operating an inductive power transfer pad.

Description of Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of e.g. three-phase windings. A first set is installed on the ground (primary windings) and can be fed by a wayside power converter (WPC). The second set of windings is installed on the vehicle. For example, the second set of windings can be attached underneath the vehicle, in the case of trams under some of its wagons. For an automobile it can be attached to the vehicle chassis. The second set of windings or, generally, the secondary side is often referred to as pick-up-arrangement or receiver. The first set of windings and the second set of windings form a high frequency transformer to transfer electric energy to the vehicle. This can be done in a static state (when there is no movement of the vehicle) and in a dynamic state (when the vehicle moves).

In particular in the case of road automobiles, a stationary primary unit comprises a plurality of elements which are often arranged spatially separated.

GB 1306403.5 (not yet published) discloses an inductive power transfer pad, in particular an inductive power transfer pad of a system for inductive power transfer to a vehicle, comprising a housing, a primary winding structure, a connecting terminal, wherein the inductive power transfer pad further comprises an inverter, wherein the inverter is arranged within the housing, wherein an input side of the inverter is electrically coupled to the connecting terminal and an output side of the inverter is electrically coupled to the primary winding structure.

Also known are inductive power transfer systems which comprise a movable primary element. U.S. Pat. No. 5,654,621 A discloses an inductive transmitter having a primary element and a secondary element which is attached to the vehicle, wherein the primary element is power driven to move in all three spatial coordinates with a predetermined spatial area.

DE 102010042395 A1 discloses a system for inductive charging of a battery of a vehicle, wherein a primary coil is automatically placeable.

DE 102007033654 A1 discloses a base unit with a driving means to reduce a distance between a primary conductor and a secondary coil.

US 2010/0235006 A1 discloses a movable automated charging apparatus comprising a base, a scissor lift, a pedestal, a joint and a charger. The charger is configured to mate with a vehicle receptacle physically or via proximity.

SUMMARY OF THE INVENTION

Against this background it is an object of the present invention to provide an inductive power transfer pad, a system for inductive power transfer and a method of operating an inductive power transfer pad which enhances an operational safety and a motion control of the power transfer pad, in particular for a set of chargeable vehicles with different ground clearances.

These objects are accomplished by the disclosure set forth herein.

An inductive power transfer pad, in particular a transfer pad of a system for inductive power transfer to a vehicle, is proposed. The inductive power transfer pad (IPT pad) can be part of a primary unit of a system for inductive power transfer. The power transfer pad comprises a stationary part and a movable part, wherein the movable part comprises a primary winding structure. The primary winding structure generates an alternating (electro-) magnetic field if the primary winding structure is energized or supplied with an operating current.

Further, the movable part is movable between a retracted state and an extended state. The power transfer pad can comprise at least one actuating means, wherein the movable part is movable by the at least one actuating means. In the context of this invention, the term "actuating means" can denote an entity of all components or elements by which the movement of the movable part is generated. The term "actuating means" can thus comprise at least one actuator and/or at least one lifting mechanism. Further, the actuating means can comprise coupling means for mechanically coupling the actuator and the lifting means and/or at least one guiding means for guiding the movement of the movable part.

The movable part can be movable at least into a first direction, in particular by the at least one actuating means. The first direction can be oriented parallel to a main propagation direction of the electromagnetic field generated by the primary winding structure. In particular, the first direction can be oriented perpendicular to the bottom surface of the power transfer pad or a surface of the ground on which the power transfer pad is mounted, wherein the first direction is directed away from the ground. In the retracted state, an upper surface of the movable part can be arranged within the same plane as an upper surface of the stationary part.

In the context of this invention, the first direction can also be defined as a vertical direction. In the following, terms as "upper", "lower", "above", "under", "lowest", "highest", "bottom" refer to the vertical direction.

In the retracted state, the movable part, in particular an upper surface of the movable part, can be positioned at a retracted position, in particular with respect to the first direction, e.g. a predetermined lowest vertical position. In the retracted state, a height of the power transfer pad, i.e. a distance of the highest portion of the power transfer pad, e.g. the upper surface of the movable part, from a mounting portion of the power transfer pad along the first direction can be minimal. Correspondingly, in the retracted state, the movable part, in particular an upper surface of the movable part, can be positioned at an extended position, e.g. a predetermined highest vertical position. In the extended state, the height of the power transfer pad can be maximal. The mounting portion can correspond to a bottom surface of the power transfer pad. The mounting portion can be used to mount the power transfer pad to a mounting structure, in particular to a surface of a route. Retracted state and the extended state can be defined by mechanical elements, e.g. stop elements, and/or by the design of the actuating means.

The height in the retracted state can be chosen from an interval from 50 mm to 110 mm, in particular from an interval from 70 mm to 90 mm. Preferably, the height in the retracted state can be equal to 80 mm. The height in the extended state can e.g. be chosen from an interval of 95 mm to 155 mm, in particular from an interval from 115 mm to 135 mm. Preferably, the height in the extended state can be equal to 125 mm.

According to the invention, the power transfer pad is designed and/or controllable such that the movable part is only movable (or movable only) to a position from a set of predetermined positions, wherein the set of predetermined positions is a subset of the set of all positions between the retracted and the extended state. In other words, the movable part is only movable to a set of selected discrete positions along the range of all theoretically possible positions between the retracted state and the extended state. The set of predetermined positions can comprise at least the position of the movable part in the retracted state and the position of the movable part in the extended state. In addition, the set of predetermined position can comprise one or more, but not all, positions between the position of the movable part in the retracted state and the position of the movable part in the extended state.

The positions can denote positions along a trajectory of the movable part, wherein the movable part is moved along said trajectory from the retracted state to the extended state and vice versa. Also, the positions can denote positions with respect to the aforementioned first direction, e.g. vertical positions.

The power transfer pad can e.g. comprise at least one position sensing means for determining the position of the movable part. Depending on the sensed position of the movable part, the movement can be controlled, e.g. by a control unit, such that the movable part is moved to a selected position from a set of predetermined positions.

Alternatively or in addition, the power transfer pad, in particular the movable part, more particular at least one lifting or guiding means or mechanism for guiding the movement of the movable part, can comprise at least one, preferably multiple, stop element(s), wherein the at least one stop element is designed and/or arranged such that the movement of the movable part is restricted to a movement into the positions of the set from predetermined positions. The at least one stop element can e.g. be a mechanical element.

This advantageously allows a simple design of the power transfer pad and/or implementation of the motion control.

In another embodiment, the movable part is only movable to the retracted state or to the extended state. In other words, the movable part is only movable to the position of the movable part in the retracted state, i.e. the retracted position, and to the position of the movable part in the extended state, i.e. the extended position. This means that the set of predetermined positions comprises only two positions.

This advantageously further simplifies the design of the power transfer pad and/or implementation of the motion control.

In another embodiment, the movable part is, in particular only, movable in steps. The movement of the movable part can e.g. be a one-step movement, e.g. a movement between the retracted state and the extended state and vice versa, or a multiple-step movement. If the movement is a multiple-step movement, the steps can have equal length or can have different lengths.

In another embodiment, the movable part is movable to a position from the set of predetermined positions such that at least a minimal air gap height is provided, wherein the minimal air gap height is larger than zero. This e.g. means that a movement of the movable part to one position of the predetermined set of positions is controllable such that at least a minimal air gap height is provided. The air gap denotes an air gap between the power transfer pad and a vehicle.

The minimal air gap height can be equal to the distance between the ground clearance of a vehicle and the movable part, e.g. the upper surface of the movable part.

The ground clearance, which can also be referred to as ride height, can be defined as the shortest distance between a flat, level surface and any part of the vehicle other than those part designed to contact the ground (such as tires, tracks etc.). The ground clearance can e.g. be provided in an unloaded configuration, e.g. with no cargo and no passengers.

The power transfer pad can comprise means for determining the air gap height or a ground clearance of a vehicle approaching the power transfer pad and/or arranged above the power transfer pad. This will be explained later.

This embodiment advantageously provides a safety interval, i.e. the air gap, between the vehicle and the power transfer pad which reduces the risk of a collision between vehicle and power transfer pad.

In another embodiment, the power transfer pad, in particular the movable part, is controllable interval-dependent, wherein the retracted state is assigned to a first interval of ground clearances of a set of chargeable vehicles and the extended state is assigned to another interval of ground clearances of the set of chargeable vehicles, wherein the power transfer pad is designed and/or controllable such that in the retracted state and the extended state a minimal air gap height is provided, wherein the minimal air gap height is larger than zero.

It is further possible that each position of the set of predetermined positions is assigned to an interval of ground clearances, wherein the power transfer pad is designed and/or controllable such that the movable part is movable to a selected position from the set of predetermined positions such that at least a minimal air gap height is provided This is equivalent to the feature that the height of the power transfer pad in the retracted state and the height of the power transfer pad in the extended state each take a predetermined value, wherein the predetermined values are chosen depending on the different intervals of ground clearances such that the minimal air gap height is provided.

An interval of ground clearances can comprise one, preferably more than one, different ground clearances. The set of chargeable vehicles comprises multiple vehicles with different ground clearances designed to be charged by the power transfer pad, i.e. comprising a receiving device with a secondary winding structure in order to receive the electromagnetic field generated by the primary winding structure. The ground clearance can, in particular, denote the minimal distance between the receiving device, in particular a bottom surface of the receiving device, and a flat, level surface of the route on which the vehicle is driving.

In an interval-dependent control, the movable part can be movable to the retracted state if a vehicle with a ground clearance of the first interval is to be charged by the power transfer pad, e.g. approaches and/or is arranged above the power transfer pad. Accordingly, the movable part can be movable to the extended state if a vehicle with a ground clearance of the other interval is to be charged by the power transfer pad. Also, the movable part can be movable to a selected position of the set of predetermined positions which is assigned to a respective interval.

In this case, the minimal air gap height can be equal to the distance between the minimal ground clearance of an interval of ground clearances and the movable part, e.g. the upper surface of the movable part, in the corresponding state.

In other words, the power transfer pad is designed and/or controllable such that the movable part is movable to a selected position of a set of predetermined positions, e.g. a set of two positions, wherein each position is assigned to another interval of ground clearances.

This advantageously provides a very simple control of the power transfer pad and an increased operational safety as a safety interval, i.e. the minimal air gap height, between the proposed power transfer pad in each position is always provided. Thus, the risk of a mechanical contact between the proposed power transfer pad and a part of the vehicle, e.g. the receiving device, is minimized, even if the vehicle is heavy loaded and/or has a flat tire.

The movable part can comprise a housing in which a primary winding structure is arranged. Further, the movable part can comprise at least one connecting terminal for a power connection of the primary winding structure and other electric elements, e.g. an converter, which can be arranged in the stationary part.

In particular, the power transfer pad can provide an elevated charging pad which can be mounted on a mounting surface, e.g. of a route.

In another embodiment, the movable part is controllable depending on a vehicle category, wherein the first interval of ground clearances is assigned to a first category and the other interval of ground clearances is assigned to another category. This means that the first interval can comprise the ground clearances of the vehicles of the first category and the other interval the ground clearances of the vehicles of the other category.

The vehicle can be a vehicle which is arranged above and/or approaching the power transfer pad. A category of vehicles can comprise multiple vehicles. The category of the vehicle can be a model-dependent or type-dependent category. It is, for instance, possible to categorize the vehicles according to a vehicle classification. A vehicle classification system can e.g. be defined by law or regulation. An example for a vehicle classification system is e.g. the US EPA size class classification, the Euro NCAP structure category-classification, the Euro NCAP class-classification and the Euro marked segment-classification. Another classification system is a vehicle segment classification.

Vehicles can e.g. be classified depending on at least one vehicle characteristic, e.g. depending on their dimensions, e.g. a length and/or a height, weight, capacity, power, number of seats, payload, etc. Vehicle categories can e.g. be a micro car, a subcompact car, a compact car, a mid-size car, an entry-level luxury car, a full size car, a convertible, a roadster, a compact SUV, a full-size SUV etc.

Also, a vehicle can be categorized depending on its ground clearance. This can e.g. mean that at least two intervals of ground clearances are defined, wherein a category corresponds to one of the at least two intervals of ground clearances.

The interval of ground clearances of the vehicles of each of category can differ from one another. These intervals can partially overlap or be totally distinct from one another. Each category has a minimal ground clearance and a maximal ground clearance.

In particular, the movable part can be moved to a predetermined category-dependent position of the set of predetermined positions, i.e. height, wherein the predetermined I position is assigned to each category. The category-dependent position can be different from one another.

This advantageously provides a simple control mechanism for the proposed power transfer pad.

A set of chargeable vehicles can be divided into more than one category of vehicles, e.g. at least two categories, wherein the retracted state, in particular the retracted position, is defined such that the minimal air gap height is provided between the movable part and the minimal ground clearance of the category comprising the vehicle with the minimal ground clearance. Further, the extended state, in particular the extended position, is defined such that the minimal air gap height is provided between the movable part and the minimal ground clearance of the category comprising the vehicle with the maximal ground clearance.

The first and the second interval differ from one another. The first and the second interval can at least partially overlap or be totally distinct from one another. In particular, the minimal ground clearance of the first interval is smaller than the minimal ground clearance of the second interval, wherein the maximal ground clearance of the second interval is higher than the maximal ground clearance of the first interval.

In the case that only two categories are defined, the movable part can be controlled such that it is only movable to two category-dependent heights, in particular to the retracted state and the extended state. This advantageously further simplifies the motion control of the proposed power transfer pad.

In another embodiment, a maximal movement of the movable part, in particular along the first direction, is determined depending on the minimal ground clearance of the interval comprising the maximal ground clearance of all intervals.

In particular, the maximal movement can be determined such that the desired minimal air gap height, i.e. the difference between the minimal ground clearance of the interval with the maximal ground clearance and the position of the movable part in the extended state takes a value larger than zero. The position of the movable part in the extended state can be the sum of the position of the movable part in the retracted state and the maximal movement. The maximal movement can e.g. be chosen from an interval from 25 mm to 65 mm, in particular from an interval from 35 mm to 55 mm. Preferably, the maximal movement is equal to 45 mm. This provides a good trade-off between a safety interval and power transfer efficiency.

In another embodiment, the minimal air gap height is chosen from an interval from 20 mm to 60 mm. In particular, the minimal air gap can be chosen from an interval from 35 mm to 45 mm.

In another embodiment, the movable part comprises at least one object detection means. The object detection means can denote a system for detecting a foreign object, in particular a metal object, within a charging volume of the power transfer pad. Alternatively or in addition, the object detection means can be denote a system for detecting a moving object within the charging volume. The charging volume can denote a volume through which at least a predetermined portion, e.g. 80%, 90% or 95%, of the electromagnetic field generated by the primary winding structure extends. The charging volume can also denote the volume through which the total electromagnetic field generated by the primary winding structure extends. Also, the charging volume can denote the volume above the power transfer pad, e.g. above the primary winding structure. A charging surface can denote a bottom surface of the charging volume. In particular, the charging surface can be an upper surface of the movable part.

The at least one object detection means can comprise at least one inductive sensing system, wherein an active or passive detection can be performed by the inductive sensing system. In each case, the inductive sensing system can comprise one or multiple detection winding(s). Multiple detection windings can be arranged in an array structure wherein the array structure covers the charging surface of the power transfer pad. In the case of an active detection, one or more excitation winding(s) can be used. An active object detection can be performed by monitoring properties of an excitation field generated by the excitation winding(s). In the case of a passive detection, only one or more passive winding(s) are used. A passive object detection can be performed by monitoring properties of the passive winding(s), in particular an inductance. Such an inductive detection system is disclosed in GB 1222712.0 (not yet published) or in GB 1311289.1 (not yet published). In the context of this invention, a detection system can be designed according to one of the embodiments as claimed in GB 1222712.0 or in GB 1311289.1 which are incorporated by reference.

The at least one object detection means can also comprise at least one capacitive sensing system. Such a capacitive detection system is disclosed in GB 1222713.8 (not yet published). In the context of this invention, a detection system can be designed according to one of the embodiments as claimed in GB 1222713.8 which is incorporated by reference.

The object detection means can also be an image-based object detection means, wherein such an image-based detection means can e.g. comprise an image capturing device, e.g. a camera.

This advantageously allows a better surveillance of the charging volume which changes its spatial position according to the movement of the movable part. Since the object detection means is part of the movable part, the charging volume can be monitored in each position of the movable part.

In another embodiment, the stationary part comprises at least one DC connecting terminal for connecting the stationary part to an external DC voltage supply means and at least one converter, wherein an input side of the converter is electrically coupled to the DC connecting terminal and an output side of the converter is electrically coupled to the primary winding structure. The external DC voltage supply means can e.g. be a DC voltage source or an electric element or circuit providing a DC voltage, e.g. an external rectifier. The external DC voltage supply means can e.g. be integrated into a so-called wall box, wherein the wall box can fed by a household electric network and provide a DC voltage.

The stationary part can comprise a housing. The converter can be arranged within the housing. In particular, the converter can be arranged within an inner volume of the housing of the stationary part. The housing of the stationary part can be a part of a housing of the power transfer pad. The converter can be designed as an inverter.

The proposed embodiment advantageously allows connecting an arbitrary DC input voltage to the DC connecting terminal of the power transfer pad, wherein the desired AC output voltage to energize the primary winding structure is generated by the pad-sided converter. This, in turn, increases a usability of the proposed power transfer pad since the power transfer pad can be operated independent from an input voltage. For example, the power transfer pad can be installed in a garage of a private house or in a parking slot of an automobile, wherein the power transfer pad can be connected to a household electric network or a battery providing DC battery voltage with an arbitrary output voltage level. In particular, the power transfer pad can be installed on the ground such that a vehicle can be positioned above the power transfer pad. The power transfer pad can be supplied by an arbitrary DC input voltage and operation is not restricted to an AC input voltage with desired characteristics, e.g. a desired amplitude and/or frequency.

Alternatively or in addition, the stationary part comprises an AC connecting terminal for connecting the stationary part to an external AC voltage supply means, wherein the converter is coupled to the AC connecting terminal via a rectifier. The external AC voltage supply means can e.g. be an AC voltage source or an electric element or circuit providing an AC voltage, e.g. an external AC network such as a household network.

In this case, the stationary part can also comprise a rectifier. The rectifier can also be arranged within the aforementioned housing. It is also possible that an input side of the converter is electrically coupled to the DC connecting terminal and an output side of the converter is electrically coupled to the primary winding structure, wherein the converter allows an AC/AC conversion.

It is possible that the power transfer pad comprises only the AC connecting terminal or only the AC connecting terminal. However, it is also possible that the power transfer pad comprises both terminals, the DC terminal and the AC connecting terminal. In the case wherein the stationary part comprises at least one AC connecting terminal, the power transfer pad can be operated by an external AC voltage. This further increases the usability of the power transfer pad.

The power transfer pad, in particular the stationary part, can comprise another AC connecting terminal for connecting an output side of the converter to the primary winding structure, wherein the other AC connecting terminal is connected to the output of the convertor. Further, the power transfer pad, in particular the stationary part, can comprise at least one filter element for filtering an AC output voltage/current provided by the converter.

Further, the power transfer pad, in particular the stationary part, can comprise a control unit for controlling an operation of the converter. The control unit can be arranged within the housing of the stationary part.

Further, the power transfer pad, e.g. the stationary part and/or the movable part, can comprise a vehicle detection system. Elements of the vehicle detection system can e.g. be a sensor and a corresponding control unit for an evaluation of output signals of the sensor. The vehicle detection system denotes a system by which a presence of a vehicle in the surrounding of the power transfer pad can be detected. The vehicle detection system can e.g. comprise an inductive or capacitive sensor element for detecting a vehicle. Preferably, the vehicle detection system can be provided by a winding structure, e.g. a coil. Further, the power transfer pad, in particular the stationary part and/or the movable part, can comprise at least one RFID (radio frequency identification) unit. Using the RFID unit, a vehicle and, if applicable, a position and/or orientation of a vehicle with respect to the power transfer pad can be detected. Thus, the RFID unit can be used as an element, in particular a sensor of a vehicle detection system.

Further, the power transfer pad, in particular the movable part, can comprise at least one guiding means for guiding a magnetic flux. In particular, the power transfer pad can comprise a ferrite arrangement, wherein the ferrite arrangement can e.g. comprise one or more ferrite bars or slabs. The guiding means can be used to guide a magnetic flux of the electromagnetic field which is generated if the primary winding structure is energized along a desired path.

Further, the inductive power transfer system, in particular the stationary part, can comprise a compensating unit for compensating a reactance, e.g. a self-inductance, of a primary winding structure. By providing or operating the compensating unit, the self-inductance of the primary winding structure can be compensated which advantageously allows operating the primary winding structure only with a desired active power. The compensating unit can e.g. comprise one or more compensating capacitors which can e.g. be connected in series to phase lines of the primary winding structure.

Further, the power transfer pad, in particular the stationary part, can comprise a human-machine-interface and/or at least one signal transmitting and receiving means. The signal transmitting and receiving means can e.g. be designed in order to allow a signal and/or data transmission between a vehicle and the power transfer pad. The human-machine-interface allows providing an input to e.g. the control unit which controls the operation of the converter. The human-machine-interface can also be provided by a monitor or a display which displays information on a status of the power transfer pad, e.g. if a charging process in progress, to a user. For this purpose, the power transfer pad can also comprise a display and/or input means, such as a keyboard.

Further, at least one phase line of the primary winding structure can have a meandering course. Alternatively, at least one phase line of the primary winding structure can be designed such that a course of the phase line provides an even number or uneven number of sub-windings which are arranged adjacent to each other. In this context, a sub-winding denotes a, preferably complete, conductor loop, which encloses a predetermined area. The conductor loop can provide or comprise one turn or multiple turns of a respective sub-winding. Adjacent to each other means that central axes of said sub-windings, in particular the axes of symmetry, are spaced apart from one another, e.g. with a predetermined distance, along a common straight line which can e.g. correspond to a direction of extension of the primary winding structure. Further, the course of at least one phase line of the primary winding structure can be 8-shaped. This means that the phase line comprises two, e.g. circular-shaped, sub-windings which are arranged adjacent to each other. In particular, the primary winding structure can comprise three phase lines.

Further, the inductive power transfer pad, in particular the movable part, can comprise a cable bearing element. The cable bearing element can be adapted position and/or to hold a plurality of line section of one or more electric lines which can provide the phase line(s) of the primary winding structure.

Further, the inductive power transfer pad, in particular the stationary part, can comprise a magnetic shielding element. The magnetic shielding element can be used to shield an external area of the power transfer pad from an electromagnetic field generated during inductive power transfer.

Generally, the proposed power transfer pad can comprise or provide one or more features of the power transfer pad disclosed in GB 1306403.5, wherein the disclosure of GB 1306403.5 is incorporated into the present disclosure by reference. In particular, the proposed power transfer pad can comprise the features of a power transfer pad according to one of the claims of GB 1306403.5.

In another embodiment, the power transfer pad comprises at least one DC voltage supply unit, e.g. the aforementioned DC voltage supply means, wherein the DC voltage supply unit is connected to a DC connecting terminal of the stationary part. The DC voltage supply unit and the power transfer pad can be provided by separate units. The DC voltage supply unit can denote a DC voltage generation unit. The DC voltage supply unit can e.g. be connected to a household electric network, wherein the DC voltage supply unit generates a predetermined DC voltage or DC current depending on the power provided by the household network. The DC supply unit can e.g. be a wall-mounted supply unit.

It is possible that the power transfer pad according to one of the previously described embodiments and the DC voltage supply unit are parts of an inductive power transfer system which comprises both units.

In another embodiment, the power transfer pad, in particular the stationary part, comprises at least one communication means for communicating with a vehicle. The communication means, e.g. the aforementioned signal transmitting and receiving means, can allow a, e.g. wireless, communication of a vehicle with the power transfer pad.

It is, for instance, possible that a vehicle approaching and/or arranged above the power transfer pad communicates with the power transfer pad. In this way, a driver of the vehicle can activate the inductive charging and/or choose a duration of the charging process and/or choose characteristics, such as the amount of power to be transferred, of the inductive charging process.

Also, at least one vehicle characteristic can be transmitted from the vehicle to the power transfer pad, e.g. if the vehicle is approaching the power transfer pad. Depending on the at least one vehicle characteristic, the ground clearance or an interval of ground clearances can be determined by the power transfer pad, e.g. a control unit of the power transfer pad, wherein the movable part can be moved to the corresponding position. The at least one characteristic can be the ground clearance of the vehicle or a piece of information which allows to determine the ground clearance. It is also possible that the vehicle can be assigned to one of the aforementioned categories depending on the at least one vehicle characteristic. The at least one vehicle characteristic can be the vehicle category or a piece of information which allows to assign the vehicle to a category. Further, using the communication means, information can be sent to the vehicle and then displayed to a driver on a vehicle-sided display. In turn, driver can input information via vehicle-sided input means, wherein the input data is sent to the pad-sided receiving means.

In another embodiment, the power transfer pad comprises a scissor lift. The scissor lift can be mechanically coupled to an actuator. Further, the scissor lift can be a part of the aforementioned actuating means. The movable part can be mechanically connected to the scissor lift. By operating the scissor lift, the movable part can be moved into or against the first direction.

Alternatively, the power transfer pad can comprise an air actuator. In another alternative, the power transfer pad can comprise a jack-like lift. The jack-like lift can denote a lever mechanism, wherein lever mechanism allows moving the movable part along the first direction if operated by an actuator. A jack-like lift can also denote a piston-cylinder-system. Alternatively, the power transfer pad can comprise a sliding block guide. The sliding block guide can guide a movement of the movable part along a trajectory, wherein a direction of movement along the trajectory extends at least partially parallel to the first direction.

In another embodiment, at least a portion of the movable part is additionally movable in a second, i.e. longitudinal, and/or a third, i.e. lateral, direction. The third direction can e.g. be parallel to a direction of extension of the primary winding structure. The third direction can be oriented perpendicular to the first direction and the second direction. The second and the third direction can define a plane which is parallel to an upper surface of the movable part. It is, for instance, possible that the movable part can comprise a, in particular flat, translation stage. The translation stage can allow a movement in the second and/or the third direction. The primary winding structure can be mounted onto the translation stage. This advantageously allow minimizing geometric dimensions of the primary winding structure since undesired offset between a primary winding structure and a secondary winding structure can be compensated by moving the primary winding structure. The translation stage can be mounted on the aforementioned scissor lift, air actuator or jack-like lift.

Further, the power transfer pad can comprise a protective bellow for protecting at least a part of the actuation means. In particular, at least a part, preferably all, elements of the actuating means can be arranged in an inner volume of the protective bellow. A housing of the movable part comprising the primary winding structure can provide a top cover of the protective bellow.

Alternatively or in addition, the movable part is additionally rotatable or tiltable. In particular, the movable part can be rotatable about a first axis and/or a third axis and/or the lateral axis which extend parallel to the aforementioned first direction, second direction and third direction respectively.

This advantageously allows changing a relative orientation between the primary and the secondary winding structure which can enhance a power transfer.

Further proposed is an inductive power transfer system, in particular for an inductive energy transfer to a vehicle. The power transfer system comprises an inductive power transfer pad according to one of the previously described embodiments. Further, the power transfer system comprises at least one receiving device for receiving an alternating electromagnetic field generated by a primary winding structure of the inductive power transfer pad. In particular, at least one dimension of the inductive power transfer pad can be larger than a corresponding dimension of the receiving device, e.g. a length, and/or a width, wherein the length can be measured along the second direction and wherein the width can be measured along the third direction.

This advantageously increases a positioning space of a vehicle with the receiving device with respect to the power transfer pad.

Further proposed is a method of operating an inductive power transfer pad, wherein the power transfer pad comprises a stationary part and a movable part. The movable part comprises a primary winding structure, wherein the movable part is movable in between a retracted state and an extended state. In particular, the power transfer pad can be designed according to one of the previously described embodiments.

According to the invention, the movable part is only moved to a, in particular selected, position from a set of predetermined positions, wherein the set of predetermined positions is a subset of the set of all positions between the retracted and the extended state. In other words, the movable part can only be moved to selected, but not all, positions along a trajectory, wherein the movable part is movable along said trajectory from the retracted state into the extended state.

The proposed method can be performed by a power transfer pad according to one of the previously described embodiments.

Furthermore, the movable part can only be moved to the retracted state or to the extended state. Furthermore, the movable part can only be moved in steps. If the selected position is reached, an operating voltage and/or current can be supplied to the primary winding structure in order to generate a desired electromagnetic field.

Thus, a simple design and/or motion control of the power transfer pad is possible.

In another embodiment, the movable part is moved to a position from the set of predetermined positions such that at least a minimal air gap height is provided, wherein the minimal air gap height is larger than zero. In this embodiment, the air gap height, e.g. a distance between the movable part and the vehicle, in particular the distance between a ground clearance of the vehicle and the position of the movable part, can be determined. This will be explained later. Thus, a vehicle-dependent control is proposed, wherein the movable part is moved into a vehicle-dependent position.

This advantageously allows a safe operation of the power transfer pad with a movable part.

In another embodiment, the power transfer pad, in particular the movable part, is controlled interval-dependent, wherein the movable part is moved to the retracted state if a vehicle with a ground clearance of a first interval of ground clearances of a set of chargeable vehicles is to be charged, wherein the movable part is moved to the extended state if a vehicle with a ground clearance of another interval of ground clearances is to be charged, wherein the power transfer pad is designed and/or controlled such that in the retracted state and the extended state a minimal air gap height is provided, wherein the minimal air gap height is larger than zero. In other words, the movable part is moved to an interval-dependent position.

The retracted state is assigned to a first interval of ground clearances of a set of chargeable vehicles and the extended state is assigned to another interval of ground clearances of the set of chargeable vehicles. Thus, each position of the movable part covers one, preferably more than one, ground clearance.

A vehicle to be charged can e.g. be detected if the vehicle approaches the power transfer pad and/or arranged above the power transfer pad. Also, the vehicle to be charged can be detected if the vehicle notifies the power transfer pad, i.e. registers for inductive charging, e.g. via a data and/or signal transmission. As explained before, the interval can be determined depending on at least one vehicle characteristic which can also be transmitted from the vehicle to the power transfer pad.

This advantageously allows a safe operation of the power transfer pad with a movable part.

In a preferred embodiment, the movable part is controlled depending on a category of a vehicle arranged above or approaching the power transfer pad. The vehicle can e.g. be assigned to one category of a set of pre-known categories depending on at least one vehicle characteristic. The at least one vehicle characteristic can e.g. be transmitted from the vehicle to the power transfer pad while approaching the power transfer pad or while being arranged above the power transfer pad, e.g. by using the aforementioned communication means. Depending on a determined category of the vehicle, the movable part can be moved to a category-dependent position. Thus, one single position can be assigned to each category of vehicles.

This advantageously allows a very simple control of the proposed power transfer pad.

In another embodiment, a minimal ground clearance of a vehicle to be charged is determined. The minimal ground clearance of the vehicle can e.g. determined depending on at least one vehicle characteristic. It is, of course, possible that the minimal ground clearance is directly transmitted from the vehicle to the power transfer pad. The movement of the movable part, in particular the movement into or against the first direction, is controlled depending on the determined minimal ground clearance. In particular, the movable part is moved to a position corresponding to the interval in to which the minimal ground clearance is assigned, wherein a difference between the minimal ground clearance and the position along the first direction is equal to or higher than the minimal air gap height.

In a preferred embodiment, the set of chargeable vehicles is divided into more than one category of vehicles, wherein a vehicle to be charged is identified and assigned to one of at least two categories of vehicles, wherein the movable part is moved to a category-dependent position, in particular to a category-dependent position along the aforementioned first direction, e.g. the vertical direction.

In particular, the set of chargeable vehicles is divided into two categories of vehicles. If a vehicle is assigned to the first category of vehicles, the movable part is moved to the retracted state, e.g. with the lowest vertical position possible. If a vehicle is assigned to the second category, the movable part is moved to the extended state, e.g. with the highest vertical position possible. In this case, the minimal ground clearance of the set of ground clearances of the first category is smaller than the minimal ground clearance of the second category of vehicles.

Further, the retracted state can be defined such that the minimal air gap height is provided between the movable part and the minimal ground clearance of the category comprising the vehicle with the minimal ground clearance, wherein the extended state is defined such that the minimal air gap height is provided between the movable part and the minimal ground clearance of the category comprising the vehicle with the maximal ground clearance.

BRIEF DESCRIPTION OF THE DRAWINGS

The invention will be described with reference to the figures, wherein the figures show.

DETAILED DESCRIPTION OF THE INVENTION

Figure 1:
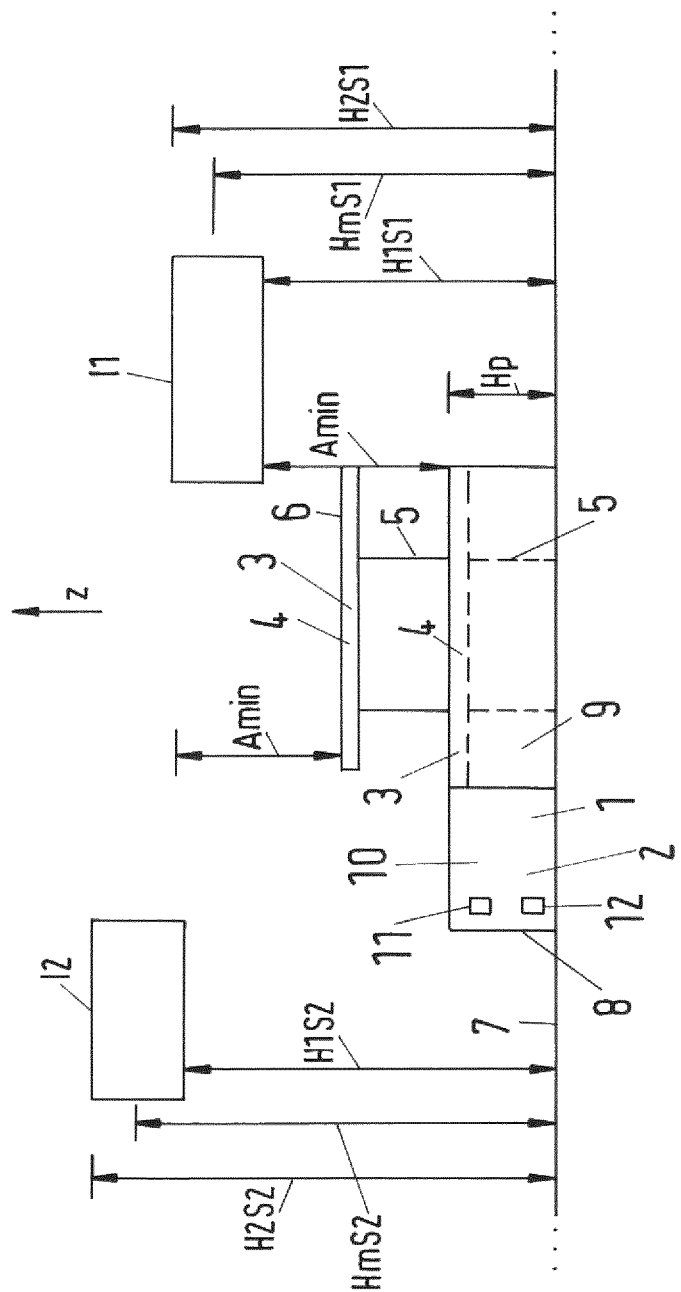
FIG. 1 a schematic side view of an inductive power transfer pad.

FIG. 1 shows a schematic side view of an inductive power transfer pad 1. The inductive power transfer pad 1 comprises a stationary part 2 and a movable part 3, wherein dashed lines show the movable part 3 in a retracted state and solid lines show the movable part 3 in an extended state. The movable part 3 comprises a plate member 4 and a lifting mechanism (not shown) which is arranged within a protective bellow 5.

Also not shown in FIG. 1 is an actuator which is mechanically coupled to the lifting mechanism such that the movable part 3, in particular the plate member 4, is movable in and against a vertical direction z. The vertical direction z is oriented orthogonal to an upper surface 6 of the plate member 4 and to a ground surface 7.

Within the plate member 4, a primary winding structure (not shown), in particular for deleting metal objects on the upper surface 6, can be arranged. Also, at least a part of elements of a foreign object detection system (not shown) can be arranged within the plate member 4.

The power transfer pad 1 is installed on the ground surface 7 which provides a driving surface for a vehicle (not shown). The power transfer pad 1 comprises a housing 8. Furthermore, the power transfer pad 1, in particular the housing 8, provides a recess 9, wherein the movable part 3 is arranged within the recess 9 in the retracted state. The recess 9 can have an arbitrary shape, in particular a cuboid shape. The stationary part 2 comprises an inner housing 10, wherein at least a part of the inner housing 10 can be provided by the housing 8 of the power transfer pad 1 or by a separate housing. In the retracted state, the upper surface 6 of the plate member 4 is arranged within the same plane as an upper surface of the housing 10 of the stationary part 2, wherein the plane is oriented orthogonal to the vertical direction z. The aforementioned actuator can be arranged within the recess 9. The movable part 3 can be moved only to the retracted state or to the extended state, in particular by a one-step movement. It is, however, also possible that the movable part 3 can be moved to selected, but not all, positions along the vertical directions.

Further shown is a first interval I1 of ground clearances which ranges from a minimal ground clearance H1S1 of the first interval I1 to a maximal ground clearance H2S1 of the first interval I1. Further shown is a second interval I2 of ground clearances which ranges from a minimal ground clearance H1S2 of the second interval I2 to a maximal ground clearance H2S2 of the second interval I2. The first interval I1 comprises ground clearances of a first category of vehicles, e.g. flat floor chassis vehicles. The second interval I2 comprises ground clearances of a second category of vehicles, e.g. SUVs.

The power transfer pad 1, in particular the stationary part 2, comprises a transmitter-receiving-device 11 for communicating with a vehicle (not shown) approaching the power transfer pad 1 and/or located above the power transfer pad 1.

A category of the vehicle can be determined depending on at least one vehicle characteristic, e.g. a weight of the vehicle in an unloaded state. Said at least one vehicle characteristic can be transmitted from the vehicle to the power transfer pad 1, in particular via the transmitter-receiving-device 11. Alternatively, a ground clearance of the vehicle can be directly transmitted to the power transfer pad 1 via the transmitter-receiver-device 11.

Further, the transfer pad 1, in particular the stationary part 2, comprises a control unit 12, wherein the control unit determines the vehicle category depending on the at least one vehicle characteristic. Depending on an e.g. pre-known assignment of a vehicle category to one of the intervals I1, I2 of ground clearances, the corresponding interval I1, I2 is determined, e.g. by the control unit. Further, a vertical position of the movable part 3, in particular of the upper surface 6 of the plate member 4, is controlled interval-dependent. If a vehicle of the category assigned to the first interval I1 is identified, the movable part 3 is moved to the retracted state, e.g. to the lowest vertical position possible. Thus, the retracted state covers all ground clearances of the first interval I1. If a vehicle of the category assigned to the second interval I2 is identified, the movable part 3 is moved to the extended state, e.g. the highest vertical position possible. Thus, the extended state covers all ground clearances of the first interval I2. The first and the second interval I1, I2 comprise multiple ground clearance values which are different from each other.

Further is shown that the vertical position of the movable part 3 assigned to an interval I1, I2 is provided such that a minimal air gap height Amin is provided. The minimal air gap height Amin can be determined as the difference between the minimal ground clearance H1S1, H1S2 of each interval I1, I2 and the vertical position of the movable part 3, in particular of the upper surface of the plate member 4, in the corresponding interval-dependent vertical position, e.g. the retracted or the extended state.

The feature that the movable part 3 is movable interval-dependent such that a minimal air gap height Amin can be equivalent to the features that the power transfer pad 1 has a minimal height in the retracted state and a maximal height in the extended state, wherein the heights are chosen interval-dependent such that a difference between the minimal ground clearance H1S1 of the interval I1 with the minimal ground clearance of all possible ground clearances is equal to the desired minimal air gap height Amin and the difference between the minimal ground clearance H1S2 of the interval I2 with the maximal ground clearance H2S2 of all possible ground clearances is also equal to the desired air gap height Amin. In the embodiment shown in FIG. 1, the minimal height of the power transfer pad 1 corresponds to an installation height Hp of the power transfer pad 1.

In FIG. 1, a maximal distance of a movement of the movable part 3 can be determined depending on the difference between a mean value HmS2 of the ground clearances of the second interval I2 and the mean value HmS1 of ground clearances of the first interval I1. The maximal movement can e.g. correspond to a maximal stroke of the movable part 3. A maximal distance of the movement can e.g. be chosen from an interval ranging from 30 mm to 70 mm, preferably equal to 45 mm or 50 mm.

The difference of the maximal air gap height to the minimal air gap height of one interval I1, I2 results in a difference of the magnetic coupling between the primary winding structure and a secondary winding structure of different vehicles with ground clearances of the respective interval I1, I2. The primary winding structure and/or the secondary winding structure can e.g. be designed and/or operated such that a desired magnetic coupling is provided in case of a maximal air gap height. Thus, the said difference of the magnetic coupling to vehicles of one category due to different ground clearances can e.g. be minimized or compensated by the (magnetic) design and/or control of the primary winding structure and/or the secondary winding structure. The difference of the magnetic coupling between two vehicles with ground clearances of different intervals I1, I2, however, is at least partially compensated by the interval-dependent movement of the movable part 3.

If a translational stage 22 (see FIG. 6) is provided, the dimensions, e.g. a length and/or a width, of the primary winding structure can be reduced in comparison to the case where only a movement into and against the vertical direction z is possible. This is because the magnetic coupling can be improved by moving the primary winding structure into or against the longitudinal direction x and/or the lateral direction y.

The power transfer pad 1 can be designed such that a power in the range of 3 kW to 20 kW can be transferred to e.g. a vehicle comprising a corresponding receiving device which can be also referred to as pick-up. In the first alternative, an amplitude of an input voltage of the power transfer pad can be 230V and an input current can be 16 A. This allows transferring 3 kW to 7 kW to a receiving device on a secondary side. In a second alternative, an amplitude of an input voltage of the power transfer pad can be 460V and an input current can be 32 A. This allows transferring around 20 kW to a receiving device on a secondary side.

Figure 2:
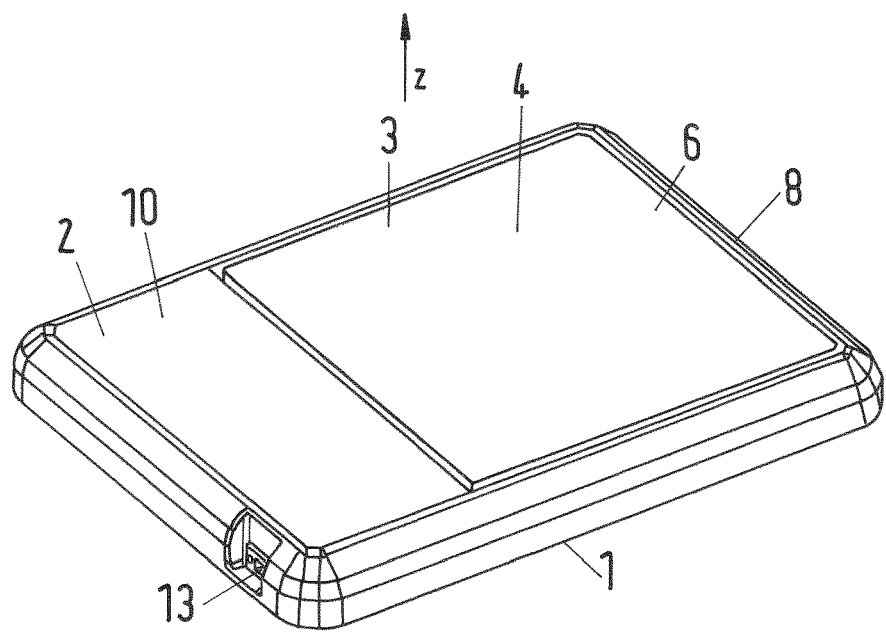
FIG. 2 a perspective view on an inductive power transfer pad in a retracted state, FIG. 3 a perspective view on the inductive power transfer pad shown in FIG. 2 in an extended state, FIG. 4 a perspective view on another inductive power transfer pad in an extended state, FIG. 5 a perspective view on the inductive power transfer pad shown in FIG. 4, and FIG. 6 a perspective view on yet another inductive power transfer pad.

FIG. 2 shows a perspective view on an inductive power transfer pad 1. Shown is a housing 8 of the power transfer pad 1. A movable part 3 with a plate member 4 is arranged within a recess 9 (see FIG. 3) in the retracted state. Further shown is the stationary part 2 with an inner housing 10. It is shown that an upper surface of the inner housing 10 of the stationary part 2 is arranged within the same plane as the upper surface 6 of the plate member 4 of the movable part 3 in the retracted state. Further shown is a connecting terminal 13 which is designed as a DC connecting terminal to connect the power transfer pad to an external DC voltage supply means. Within the inner housing 10 of the stationary part 2, a converter (not shown) can be arranged. An input side of the converter can be connected to the DC connecting terminal 13. Further, a transmitter-receiver-device 11 and a control unit 12 (see FIG. 1) can be arranged within the inner housing 10 of the stationary part 2. The control unit 12 can control a movement of the movable part 3 and an operation of the converter. It is, however, possible to provide multiple control units for the different control operations. Moreover, compensating elements (not shown) for compensating a reactance of a primary winding structure (not shown) filter elements for filtering an output voltage/current of the converter can be arranged within the inner housing 10 of the stationary part 2. The inner housing 10 of the stationary part 2 protects the elements arranged within the housing 10 of the stationary part 2, e.g. from dirt or water, even if the movable part 3 is moved out of the recess 9, e.g. into the extended state.

Figure 3:
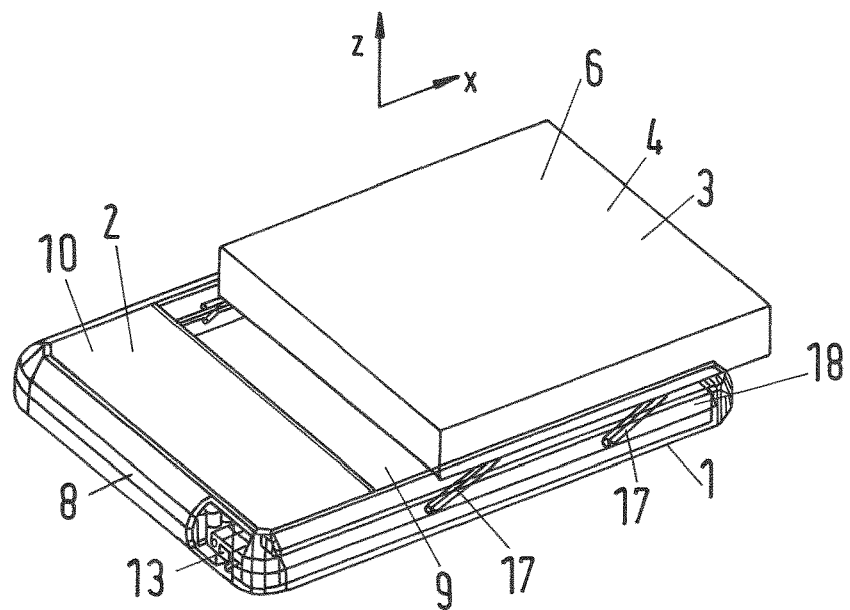

FIG. 3 shows a perspective view of the power transfer pad 1 shown in FIG. 2. An actuator can be arranged within a recess 9. The plate member 4 can comprise another recess on a bottom side of the plate member 4, wherein the other recess is designed and arranged such that the actuator can be arranged within the other recess in the retracted state of the movable part 3. Further, coupling means for coupling the actuator to the plate member 4 can be provided. In the example shown in FIG. 3, the lifting mechanism comprises four motion guides 17 (e.g. guide rails), wherein the motion guides 17 may be formed by the sidewalls 18 of the recess 9. The motion guides 17 are inclined and extend upwards. At least one element (not shown, for example a bearing element) of the movable part 3 may engage (e.g. project into) each of the motion guides 17, so that motion of the bearing elements and thereby the movable part 3 is guided while the lifting mechanism is operated. If the actuating device exerts a force in a horizontal direction x onto the movable part 3, it moves along the motion guide upwards and is thereby lifted. The lifting motion may be limited by a stop element, such as the end of the motion guides (e.g. guide rails). There may be through-holes in the bottom section of the sidewall 18 which enable liquids from the interior to be drained to the environment. The power transfer pad 1 thus comprises a sliding block guide.

Figure 4:
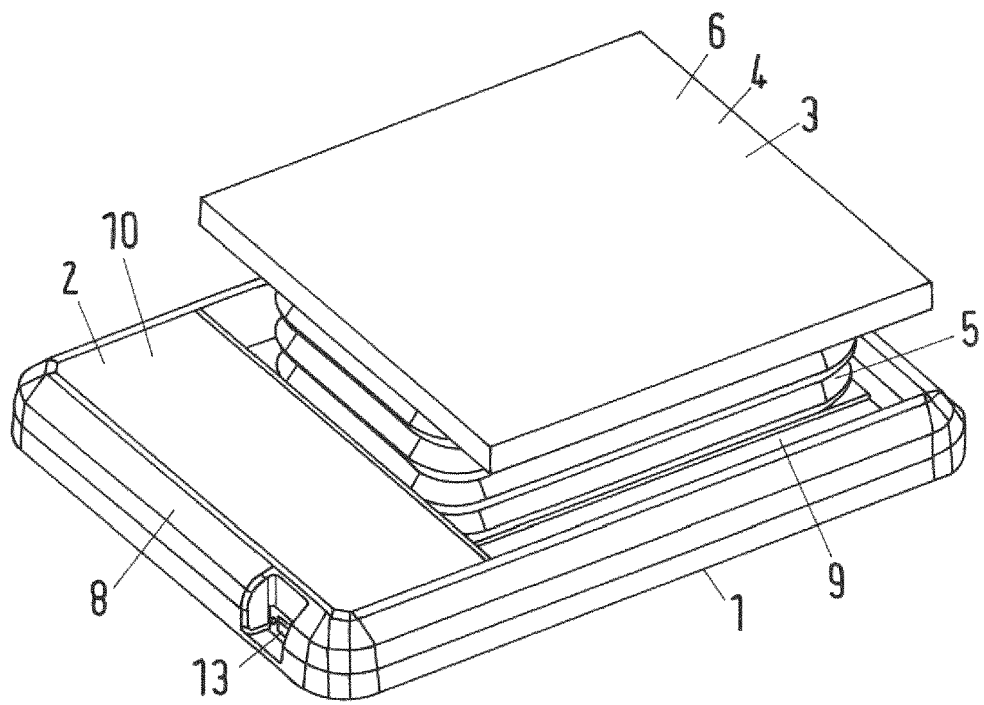

FIG. 4 shows a perspective view on a power transfer pad 1 in another embodiment. Again, a movable part 3 comprises a plate member 4 with an upper surface 6. The movable part 3 comprises a lifting mechanism designed as a scissor lift 19 (see FIG. 5). The lifting mechanism is arranged within a protective bellow 5. In FIG. 4, an extended state of the movable part 3 is shown.

FIG. 5 shows another perspective view of the power transfer pad 1 shown in FIG. 4. In particular, a scissor lift 19 is shown which provides a part of the lifting mechanism. The scissor lift 19 is actuated by an actuator 14 which is arranged within the recess 9 of a housing 8 of the power transfer pad 1. Further shown are power cables 20 by which a primary winding structure (not shown) integrated into the plate member 4 is connected to an output side of an converter (not shown) arranged within the inner housing 10 of the stationary part 2, e.g. via an AC output terminal of the stationary part 2.

By means of the scissor lift 19, the movable part 3 is movable into and against a vertical direction z.

Figure 6:
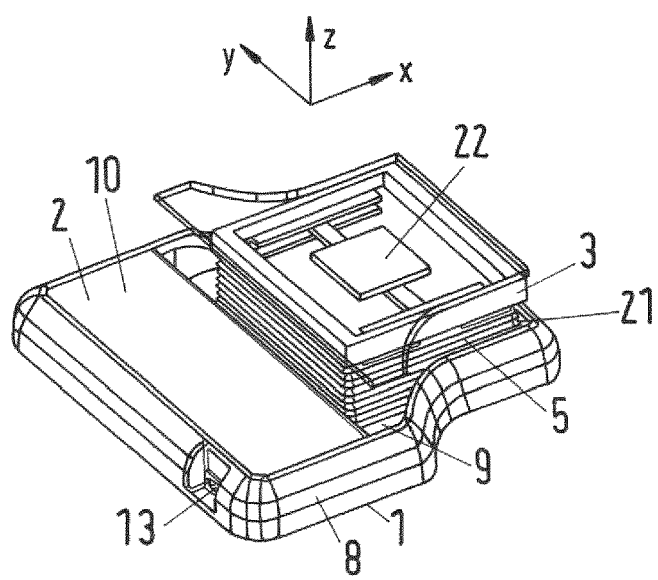

FIG. 6 shows a perspective view on another embodiment of a power transfer pad 1. Not shown is a plate member 4 (see e.g. FIG. 1) which comprises primary winding structure. In FIG. 6, the movable part 3 comprises an air lift 21, wherein a translation stage 22 is arranged at an upper end of the air lift 21. The translation stage 22 is designed and arranged such that a translational movement can be performed in a longitudinal direction x and a lateral direction y, wherein a plane spanned by the longitudinal direction x and the lateral direction y is parallel to an upper surface 6 of the plate member 4. The plate member 4 can be mechanically connected to the translational stage 22. The air lift 21 comprises a protective bellow 5. Instead of an air lift 21, a scissor lift 19 (see FIG. 5) or a piston-cylinder-arrangement can be used in order to provide the movability into and against the vertical direction z.

The power transfer pad 1 shown in the described embodiments can further comprise a safety mechanism for avoiding an uncontrolled movement, in particular an uncontrolled lowering, of the movable part 3. The safety mechanism can e.g. comprise a spring element and/or a damping element which is arranged between the movable part 3, in particular the plate member 4, and a stationary section of the power transfer pad 1, e.g. a ground of the recess 9. If e.g. a power supply of an actuator 14 (see e.g. FIG. 5) fails, a controlled movement, e.g. a controlled lowering, in particular with a limited acceleration and/or velocity, can be provided by the safety mechanism.

Further, the power transfer pad can comprise a force sensor for sensing a force acting on the movable part 3, in particular on the plate member 4. If a force exceeds a predetermined threshold value, the movement of the movable part 3 can be stopped. This e.g. avoids pressing against an object located above movable part 3 during a raising of the movable part 3 and/or pressing against an object located below the movable part 3, in particular below the plate member 4, in particular within the recess 9, during lowering of the movable part 3.

In addition to or alternative to a force sensor, other object detection means can be used in order to detect objects within the movement range of the movable part 3, wherein a movement of the movable part 3 can be controlled, e.g. stopped, if a foreign object is detected along a desired movement path of the movable part 3.

It is also possible that the lifting device is provided by a jack-like lifting member, wherein an actuator actuates the jack-like member such that the movable part, in particular the plate element, is moved along or against a vertical direction z.

The invention claimed is:

1. An inductive power transfer pad for inductive power transfer to a vehicle, comprising a stationary part and a movable part, wherein the movable part comprises a primary winding structure, wherein the movable part is movable between a retracted state and an extended state,
wherein
the power transfer pad is designed or controllable such that the movable part is only movable to a position from a set of predetermined positions, wherein the set of predetermined positions is a subset of the set of all positions between the retracted and the extended state,
wherein
the power transfer pad is controllable interval-dependent, wherein the retracted state is assigned to a first interval of ground clearances of a set of chargeable vehicles and the extended state is assigned to another interval of ground clearances of the set of chargeable vehicles, wherein the power transfer pad is designed or controllable such that in the retracted state and the extended state a minimal air gap height is provided, and wherein the minimal air gap height is larger than zero.

2. The inductive power transfer pad according to claim 1, wherein the movable part is only movable to the retracted state or to the extended state.

3. The inductive power transfer pad according to claim 1, wherein the movable part is movable in steps.

4. The power transfer pad according to claim 1, wherein the movable part is controllable depending on a vehicle category, wherein the first interval of ground clearances is assigned to a first category and the other interval of ground clearances is assigned to another category.

5. The power transfer pad according to claim 1, wherein a maximal movement of the movable part is determined depending on the minimal ground clearance of the interval comprising a maximal ground clearance of all intervals.

6. The power transfer pad according to claim 1, wherein the minimal air gap height is chosen from an interval from 20 mm to 60 mm.

7. The power transfer pad according to claim 1, wherein the movable part comprises at least one object detection means.

8. The power transfer pad according to claim 1, wherein the stationary part comprises a converter, wherein the stationary part comprises at least one DC connecting terminal for connecting the stationary part to an external DC voltage supply means, wherein an input side of the converter is electrically coupled to the at least one DC connecting terminal and an output side of the converter is electrically coupled to the primary winding structure or wherein the stationary part comprises at least one AC connecting terminal for connecting the stationary part to an external AC voltage supply means, wherein the converter is coupled to the AC connecting terminal via a rectifier.

9. The power transfer pad according to claim 1, wherein the power transfer pad comprises at least one DC voltage supply unit, wherein the DC voltage supply unit is connected to a DC connecting terminal of the stationary part.

10. The power transfer pad according to claim 1, wherein the power transfer pad comprises at least one communication means for communicating with a vehicle.

11. The power transfer pad according to claim 1, wherein the power transfer pad comprises a scissor lift, an air actuator, a jack-like lift, or a sliding block guide.

12. The power transfer pad according to claim 1, wherein at least a portion of the movable part is additionally movable in a second or a third direction.

13. An inductive power transfer system, for an inductive energy transfer to a vehicle, comprising the inductive power transfer pad according to claim 1, and at least one receiving device for receiving an alternating electromagnetic field generated by a primary winding structure of the inductive power transfer pad.

14. A method of operating an inductive power transfer pad, wherein the power transfer pad comprises a stationary part and a movable part, wherein the movable part comprises a primary winding structure, wherein the movable part is movable between a retracted state and an extended state, wherein the movable part is only moved to a position from a set of predetermined positions, wherein the set of predetermined positions is a subset of the set of all positions between the retracted state and the extended state, wherein the power transfer pad is controlled interval-dependent, wherein the movable part is moved to the retracted state if a vehicle with a ground clearance of a first interval of ground clearances of a set of chargeable vehicles is to be charged, wherein the movable part is moved to the extended state if a vehicle with a ground clearance of another interval of ground clearances is to be charged, wherein the power transfer pad is designed or controlled such that in the retracted state and the extended state a minimal air gap height is provided, and wherein the minimal air gap height is larger than zero.

15. The method according to claim 14, wherein the movable part is controlled depending on a category of a vehicle arranged above or approaching the power transfer pad.

16. The method according to claim 14, wherein a minimal ground clearance of a vehicle to be charged is determined, wherein movement of the movable part is controlled depending on a determined minimal ground clearance.

17. The method according to claim 14, wherein a set of chargeable vehicles is divided into more than one category of vehicles, wherein a vehicle to be charged is identified and assigned to one of at least two categories of vehicles, and wherein the movable part is moved to a category-dependent position.

18. The power transfer pad of claim 1, wherein at least a portion of the movable part is additionally rotatable.

* * * * *